H. E. TRENT.
ELECTRICAL MEASURING INSTRUMENT.
APPLICATION FILED NOV. 19, 1914.

1,282,497.

Patented Oct. 22, 1918.
2 SHEETS—SHEET 1.

WITNESSES:

INVENTOR
Harold E. Trent.
BY
ATTORNEY

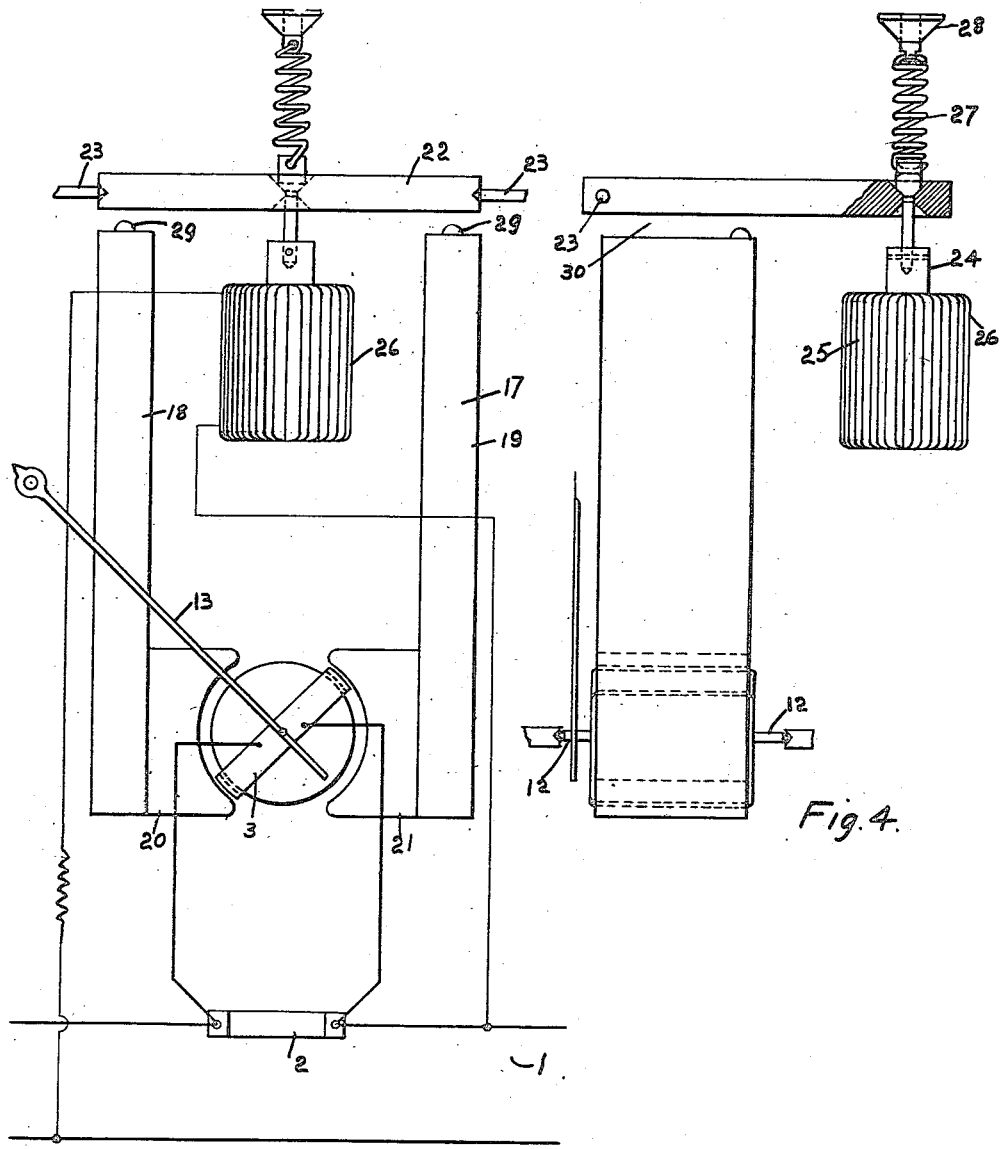

UNITED STATES PATENT OFFICE.

HAROLD E. TRENT, OF WILKINSBURG, PENNSYLVANIA.

ELECTRICAL MEASURING INSTRUMENT.

1,282,497.

Specification of Letters Patent. Patented Oct. 22, 1918.

Application filed November 19, 1914. Serial No. 873,063.

*To all whom it may concern:*

Be it known that I, HAROLD E. TRENT, a subject of the King of Great Britain, and a resident of Wilkinsburg, in the county of Allegheny and State of Pennsylvania, have invented a new and useful Improvement in Electrical Measuring Instruments, of which the following is a specification.

My invention relates to electrical measuring instruments and it has particular reference to wattmeters.

The object of my invention is to provide a wattmeter of either the indicating, recording or integrating types, that will be simple and inexpensive in construction and accurate in operation.

I provide a wattmeter that comprises a movable current coil and a permanent magnet and I vary the effective magnetic lines of force of the permanent magnet in accordance with the voltage of the circuit, the energy of which is to be measured. It will, of course, be understood that the varying of the magnetic lines of force does not impair the permanency of the magnet.

Figure 1:
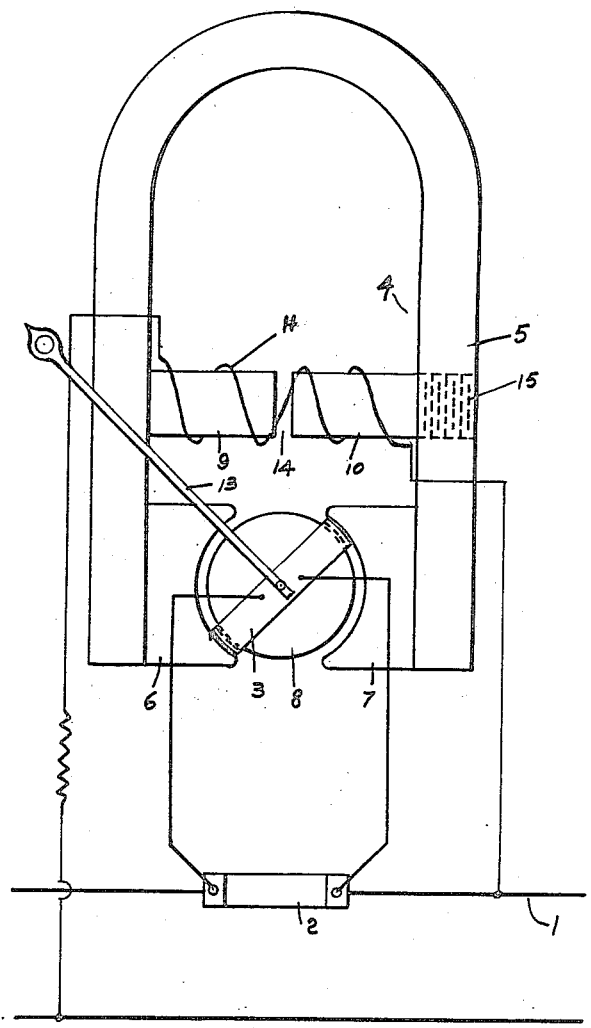
Figure 2:
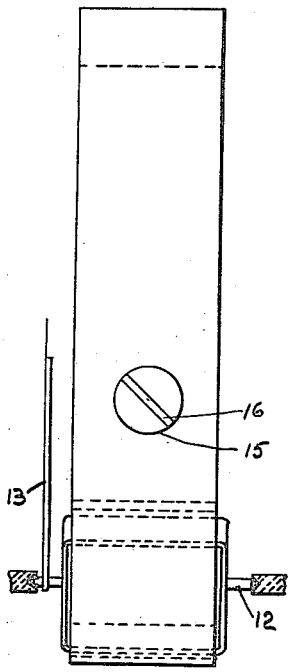

Figure 1 of the accompanying drawings is a front elevational view of an indicating wattmeter embodying my invention; Fig. 2 is a side elevational view of the wattmeter shown in Fig. 1; and Fig. 3 is a front elevational view and Fig. 4 is a side view, partially in elevation and partially in section, respectively, of a wattmeter embodying a modified form of my invention.

In Figs. 1 and 2, of the drawings, an electrical circuit 1 is provided with a load shunt 2 to the terminals of which are connected the terminals of a current winding 3. The current winding 3 constitutes the armature winding of a wattmeter 4 that comprises a permanent magnet 5 having two field magnet pole pieces 6 and 7, a core or stationary magnetizable member 8 around which the armature is adapted to turn, two magnetizable members or projections 9 and 10 that are adapted to bridge or shunt the magnetic lines of force from the field magnet pole pieces 6 and 7 under predetermined conditions, a potential winding 11 that surrounds the magnetizable members 9 and 10 and a shaft 12 upon which is mounted the armature winding 3 together with a pointer 13.

The magnetizable members 9 and 10 are separated by an air gap 14 and the member 10 is provided with a screw threaded neck 15 for the purpose of varying the width of the air gap 14. The potential winding 11 is connected in shunt relation to the circuit 1 for the purpose of energizing the members 9 and 10 in proportion to the potential of the circuit 1.

When there is no voltage impressed on the circuit 1, no current will traverse the winding 11 and the magnetic lines of force of the permanent magnet 5 will traverse the path of least reluctance, namely, through the magnetizable members 9 and 10. Thus, there will be very little tendency for the armature to turn. Neither will there be any tendency for the armature to turn when a potential is impressed on the circuit 1 if no current traverses the same. However, when current traverses the circuit 1, a proportional current will traverse the armature winding 3 and the magnetic lines of force from the same will coöperate with the main magnetic lines of force from the permanent magnet 5 to cause the armature to turn through an angle that is proportional to the product of the two forces or to the energy traversing the circuit 1. It will be understood that the winding 11 is so connected that it tends to induce magnetic lines of force in the members 9 and 10 that are opposed to the main magnetic lines of force. Thus, the higher the potential the less the leakage through the members 9 and 10 and the more lines of force will traverse the pole pieces 6 and 7. From the foregoing it will be seen that the magnetic lines of force of the permanent magnet that coact with the magnetic lines of force induced by the armature are proportional to the potential of the circuit.

The screw threaded neck or projection 15 is provided with a slit 16 in its end for the purpose of inserting a screw driver to adjust the width of the air gap 14. The air gap 14 may be adjusted to insure the correct magnetomotive force differences when the instrument is calibrated.

In Figs. 3 and 4, of the drawings, an electric circuit 1 is provided with a load shunt 2 similar to the device shown in Figs. 1 and 2. The terminals of the armature winding 3 of the instrument are connected to the respective terminals of the shunt 2 for the purpose of supplying the armature winding with current proportional to the current that traverses the circuit 1. A permanent magnet 17 is provided with two arms or legs 18 and 19, field magnet pole pieces 20 and 21 on the lower ends thereof and a bridging member 22 at the upper end thereof. The bridging member 22 is pivotally mounted on pins 23 and is operatively connected to the movable core member 24 of an electromagnet 25. The winding 26 of the electromagnet 25 is connected in shunt relation to the circuit 1 and the movable core member 24 is connected to one end of a helical spring 27 the other end of which is attached to a stationary member 28. At the upper ends of the arms 18 and 19 of the permanent magnet 17 are mounted non-magnetic stops 29 to prevent the bridging member 22 from becoming attracted into permanent engagement with the arms 18 and 19.

The armature 3 is mounted on a shaft 12 with a pointer 13 substantially as described with respect to Figs. 1 and 2.

Since the spring 27 is adapted to oppose the action of the electromagnet 25 when no potential is impressed on the circuit 1, the reluctance of the permanent magnet 17 is a maximum because the air gaps 30 between the bridging member 22 and the arms 18 and 19 is a maximum. However, when the potential is impressed on the circuit 1, the reluctance decreases in proportion to the potential because the movable core member is moved downwardly to decrease the width of the air gap 30. Thus, since the magnetic lines of force traversing the magnet 17 vary in accordance with the potential, the armature will turn through an angle proportional to the energy in the circuit 1.

It will be understood that while I have shown and described two desirable forms of my invention as employed in indicating wattmeters, it is capable of various modifications and adaptations such as recording, and integrating instruments. I therefore desire that only such limitations shall be imposed as are set forth in the appended claims.

I claim as my invention:

1. A wattmeter for an electric circuit comprising a normally shunted permanent magnet, an armature disposed between its poles and supplied with current in proportion to the current traversing the circuit, and a winding supplied with current proportional to the potential of the circuit for so opposing the shunting of the magnet that the magnetomotive force drop between the poles varies in accordance with the potential.

2. A wattmeter for an electric circuit comprising a normally shunted permanent magnet, a rotatable current winding disposed between its poles, and a winding adapted to so oppose the shunting of the permanent magnet that the magnetomotive force drop between its poles varies in accordance with the potential of the circuit.

3. A measuring instrument for an electric circuit comprising a permanent magnet, means for normally shunting the flux from the poles thereof, a rotatable current winding disposed between the poles and means disposed around the shunting means to cause the magnetic lines of force across the poles to vary in accordance with the potential of the circuit.

4. A measuring instrument for an electric circuit comprising a permanent magnet having a magnetizable bridge between its poles, a rotatable current winding disposed between the poles of the magnet and a potential winding disposed around the said bridge for opposing the flow of magnetic lines of force through the bridge from the permanent magnet in accordance with the potential of the circuit.

5. A measuring instrument for an electric circuit comprising a permanent magnet having means for normally shunting the magnetic lines of force from the poles of the magnet, a movable current winding disposed between the poles thereof and means for opposing the flow of the magnetic lines of force through the shunting means in accordance with the potential of the circuit.

6. A wattmeter for an electric circuit comprising a permanent field magnet having field magnet pole pieces, an armature disposed between the said pole pieces, means for shunting the magnetic lines of force from the armature when there is no potential impressed upon the circuit and means for causing permanent magnetic lines of force to thread the armature winding in accordance with the potential of the circuit.

7. A measuring instrument for an electric circuit comprising a main permanent magnet having pole pieces thereon, a rotatable armature disposed between the pole pieces and means for causing the magnetic lines of flux of the magnet to be shunted from the pole piece in inverse proportion to the voltage of the circuit.

8. A wattmeter for an electric circuit comprising a permanent magnet having field magnet pole pieces and a magnetizable bridge, an armature winding supplied with current proportional to the current traversing the circuit and adapted to rotate between the said field magnet pole pieces and a potential winding disposed around the magnetizable bridge for causing the magnetic lines of force from the permanent magnet to traverse the pole pieces and the armature in proportion to the voltage of the circuit.

9. A wattmeter for an electric circuit comprising a permanent magnet having pole pieces, a magnetic bridge between the poles of the magnet and a winding disposed around the magnetic bridge and adapted to oppose the flow of magnetic lines of force through the bridge in proportion to the voltage of the circuit.

10. A wattmeter comprising a permanent field magnet having pole pieces thereon and a magnetic bridge between its poles, a rotatable armature disposed between the pole pieces and a winding on the bridge adapted to vary the magnetomotive force drop between the pole pieces in accordance with the potential of the circuit.

11. A wattmeter for an electric circuit comprising a permanent magnet having pole pieces, a rotatable current winding disposed between the pole pieces and a stationary potential winding adapted to cause magnetic lines of force to be shunted from the pole pieces in inverse proportion to the potential of the circuit.

12. A wattmeter for an electric circuit comprising a permanent magnet having pole pieces and a magnetic bridge between its poles, a rotatable current winding disposed between the pole pieces and a winding on the bridge for varying the density of the magnetic lines of force between the pole pieces in accordance with the potential of the circuit.

13. A wattmeter for an electric circuit comprising a permanent magnet, means for normally shunting the magnetic lines of force from its poles, an armature disposed between the poles of the magnet and adapted to be supplied with current in accordance with the current traversing the circuit, and means for opposing the flow of magnetic lines of force through the shunting means in accordance with the potential of the circuit.

14. A measuring instrument for an electric circuit comprising a main permanent magnet having pole pieces, a rotatable armature disposed between the pole pieces, a bridging member between the poles of the magnet and means disposed on the bridging member for causing the magnetic lines of force of the magnet to be shunted from its pole pieces in inverse proportion to the voltage of the circuit.

15. A wattmeter for an electric circuit comprising a permanent magnet, a rotatable armature disposed between the poles of the magnet and adapted to be supplied with current proportional to the current traversing the circuit, and means for shunting the magnetic lines of force from the armature in inverse proportion to the potential of the circuit.

16. A wattmeter for an electric circuit comprising a permanent magnet, a rotatable armature disposed between the poles of the magnet and adapted to be supplied with current proportional to the current traversing the circuit, and a stationary winding adapted to coöperate with the permanent magnet for shunting the magnetic lines of force from the armature in inverse proportion to the potential of the circuit.

17. A measuring instrument for an electric circuit comprising a permanent magnet having means for normally shunting the magnetic lines of force from the poles thereof, an armature disposed between the poles and means for opposing the flow of magnetic lines of force through the shunting means in accordance with the potential of the circuit.

In testimony whereof, I have hereunto subscribed my name this 18th day of November, 1914.

HAROLD E. TRENT.

Witnesses:
B. B. Hines,
R. D. Brown.